United States Patent
Koshiba et al.

(10) Patent No.: US 6,716,931 B2
(45) Date of Patent: Apr. 6, 2004

(54) VULCANIZED SOLID RUBBER

(75) Inventors: Junichi Koshiba, Ichihara (JP); Sadayuki Nakano, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 16 days.

(21) Appl. No.: 10/112,704

(22) Filed: Apr. 2, 2002

(65) Prior Publication Data

US 2003/0149188 A1 Aug. 7, 2003

(30) Foreign Application Priority Data

May 30, 2001 (JP) ........................................ 2001-162064

(51) Int. Cl.7 ...................... C08F 136/06; C08F 210/18; C08F 212/34
(52) U.S. Cl. ................. 525/331.9; 526/336; 526/348.6; 526/916; 521/140
(58) Field of Search .............................. 526/336, 348.6, 526/916; 521/140; 525/331.9

(56) References Cited

U.S. PATENT DOCUMENTS 6,384,290 B1 * 5/2002 Koshiba ...................... 585/10

* cited by examiner

Primary Examiner—Robert Deshon Harlan
(74) Attorney, Agent, or Firm—Sughrue Mion, PLLC

(57) ABSTRACT

There is provided vulcanized solid rubber, which comprises a vulcanized product of an oil-extended copolymer comprising:

(i) 100 parts by weight of an ethylene-α-olefin-non-conjugated diene copolymer satisfying the following requirements (1) to (4), and (ii) 10 to 90 parts by weight of an extender oil:

(1) a weight ratio of an ethylene unit to an α-olefin unit in the ethylene-α-olefin-non-conjugated diene copolymer is from 73/27 to 40/60, (2) an iodine value of the ethylene-α-olefin-non-conjugated diene copolymer is from 20 to 36, (3) Mooney viscosity ($ML_{1+4}$ (121° C.)) measured according to JIS-K-6300 of a blend containing 100 parts by weight of the ethylene-α-olefin-non-conjugated diene copolymer and 20 parts by weight of an extender oil is from 100 to 180, and (4) a ratio of weight average molecular chain length/number average molecular chain length measured by gel permeation chromatography of the ethylene-α-olefin-non-conjugated diene copolymer is from 3 to 5.

9 Claims, No Drawings

VULCANIZED SOLID RUBBER

FIELD OF THE INVENTION

The present invention relates to vulcanized solid rubber, which is superior in its long-term compressive permanent strain; sealing efficiency; low-temperature characteristics; fatigue durability; processability such as kneadability, extrudability and shape-retaining property; and its appearance. The "solid rubber" means rubber having substantially no cell, and it is different from cellular rubber or sponge.

BACKGROUND OF THE INVENTION

Most of vulcanized solid rubber used for applications such as a car have been produced by vulcanizing ethylene-α-olefin-non-conjugated diene copolymer rubber superior in its heat resistance, weather resistance, processability and cost. However, such vulcanized solid rubber cannot satisfy the following requirements recently required for vulcanized solid rubber.

A problem such that a sound such as engine sound, wind-cutting sound around doors and creaking sound of tires comes into a room during high-speed run of a car, and a problem of rain-leaking depend largely upon sealing performance of doors and windows. Therefore, vulcanized solid rubber having much more superior sealing efficiency has been desired. Particularly, materials such as a door-sealing material, a window-sealing material and an engine mount are used under compressed conditions for a long period of time, and therefore, vulcanized solid rubber having little compressive permanent strain has been desired.

The compressive permanent strain can be improved by using such an ethylene-α-olefin-non-conjugated diene copolymer rubber having a high Mooney viscosity as a blend of 100 parts by weight of the ethylene-α-olefin-non-conjugated diene copolymer rubber and 20 parts by weight of an extender oil exceeds 100 of Mooney viscosity ($ML_{1+4}$ (121° C.)). However, vulcanized solid rubber obtained using such an ethylene-α-olefin-non-conjugated diene copolymer rubber has problems of poor kneadability, formation of carbon aggregation lumps, surface roughening and edge cutting of extrusion molded products, and surface roughening of die molded products.

Further, it is important that car doors and car windows can be opened and shut smoothly in a wide temperature range of from a low temperature to a high temperature. Therefore, vulcanized solid rubber capable of maintaining sufficient flexibility in a wide temperature range has been desired.

SUMMARY OF THE INVENTION

An object of the present invention is to provide vulcanized solid rubber, which is superior in its long-term compressive permanent strain; sealing efficiency; low-temperature characteristics; fatigue durability; processability such as kneadability, extrudability and shape-retaining property; and its appearance.

The present inventors have undertaken extensive studies of vulcanized solid rubber. As a result, it has been fond that the above-mentioned object can be accomplished by using a combination of an ethylene-α-olefin-non-conjugated diene copolymer having a high Mooney viscosity and an extender oil. Thereby, the present invention has been obtained.

The present invention provides vulcanized solid rubber, which comprises a vulcanized product of an oil-extended copolymer comprising:

(i) 100 parts by weight of an ethylene-α-olefin-non-conjugated diene copolymer satisfying the following requirements (1) to (4), and
(ii) 10 to 90 parts by weight of an extender oil:
  (1) a weight ratio of an ethylene unit to an α-olefin unit in the ethylene-α-olefin-non-conjugated diene copolymer is from 73/27 to 40/60,
  (2) an iodine value of the ethylene-α-olefin-non-conjugated diene copolymer is from 20 to 36,
  (3) Mooney viscosity ($ML_{1-4}$ (121° C.)) measured according to JIS-K-6300 of a blend containing 100 parts by weight of the ethylene-α-olefin-non-conjugated diene copolymer and 20 parts by weight of an extender oil is from 100 to 180, and
  (4) a ratio of weight average molecular chain length/number average molecular chain length measured by gel permeation chromatography of the ethylene-α-olefin-non-conjugated diene copolymer is from 3 to 5.

DETAILED DESCRIPTION OF THE INVENTION

Examples of the α-olefin of the ethylene-α-olefin-non-conjugated diene copolymer contained in the oil-extended copolymer used in the present invention are propylene, 1-butene, 1-pentene, 1-hexene, 4-methyl-1-pentene, 1-octene and 1-decene. Of these, propylene and 1-butene are preferred.

A weight ratio of an ethylene unit and an α-olefin unit, namely, ethylene unit/α-olefin unit, in said copolymer is from 73/27 to 40/60, and preferably from 67/33 to 45/55. Here, the "unit" means a polymerized monomer unit. For example, the "ethylene unit" means a polymerized ethylene unit. When the ethylene unit exceeds 73 parts by weight, the vulcanized solid rubber obtained may extremely deteriorate its compressive permanent strain at a low temperature. When the ethylene unit is less than 40, dispersion of a reinforcing agent such as carbon black and inorganic fillers in the vulcanized solid rubber obtained may be insufficient, thereby roughening a surface of the solid rubber.

In the present invention, the "non-conjugated diene" of said copolymer means not only a non-conjugated diene but also a non-conjugated polyene such as a non-conjugated triene. Examples of such compounds are linear non-conjugated dienes such as 1,4-hexadiene, 1,6-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetraindene, 5-vinylnorbornene, 5-ethylidene-2-norbornene and 6-chloromethyl-5-isopropenyl-2-norbornene; trienes such as 2,3-diisopropylidene-5-norbornene, 2-ethylidene-3-isopropylidene-5-norbornene, 2-propenyl-2,2-norbornadiene, 1,3,7-octatriene and 1,4,9-decatriene; 5-vinyl-2-norbornene; 5-(2-propenyl)-2-norbornene; 5-(3-butenyl)-2-norbornene; 5-(4-pentenyl)-2-norbornene; 5-(5-hexenyl)-2-norbornene; 5-(5-heptenyl)-2-norbornene; 5-(7-octenyl)-2-norbornene; 5-methylene-2-norbornene; 6,10-dimethyl-1,5,9-undecatriene; 5,9-dimethyl-1,4,8-decatriene; 4-ethylidene-8-methyl-1,7-nonadiene; 13-ethyl-9-methyl-1,9,12-pentadecatriene; 5,9,13-trimethyl-1,4,8,12-tetradecadiene; 8,14,16-trimethyl-1,7,14-hexadecatriene and 4-ethylidene-12-methyl-1,11-pentadecadiene. These compounds may be used singly or in combination of two or more. A preferred compound is 5-ethylidene-2-norbornene or dicyclopentadiene or a combination of both.

An iodine value of the ethylene-α-olefin-non-conjugated diene copolymer contained in the oil-extended copolymer is from 20 to 36, and preferably from 22 to 32. When the iodine value is less than 20, the vulcanized solid rubber obtained may deteriorate its compressive permanent strain, or decrease its vulcanization speed. In this regard, when a large amount of a vulcanization accelerator is used in order to increase the vulcanization speed, the vulcanized solid rubber obtained may have blooming. When the iodine value exceeds 36, flexibility of the vulcanized solid rubber obtained may be insufficient.

Mooney viscosity of the ethylene-α-olefin-non-conjugated diene copolymer contained in the oil-extended copolymer satisfies a requirement that Mooney viscosity ($ML_{1+4}$ (121° C.)) measured according to JIS-K-6300 of a blend containing 100 parts by weight of said copolymer and 20 parts by weight of an extender oil is from 100 to 180, and preferably from 110 to 170. Here, the reason why the Mooney viscosity is expressed not by the Mooney viscosity of said copolymer itself but by that of the above-mentioned blend is as follows. In measuring Mooney viscosity of a copolymer having Mooney viscosity as high as 200 or more, an inconvenience such as a slip occurs between a torque-detecting rotor and the copolymer. Occurrence of such an inconvenience is unavoidable from a structural viewpoint of a Mooney viscosity measurement apparatus. As a result, it may be difficult to measure an accurate Mooney viscosity. When the Mooney viscosity is less than 100, it may be difficult to obtain vulcanized solid rubber having little compressive permanent strain, or vulcanized solid rubber having good fatigue durability. When the Mooney viscosity exceeds 180, it may be difficult to obtain vulcanized solid rubber having little quality variations. Incidentally, it is desirable that Mooney viscosity of the copolymer itself exceeds 200.

A Q value, namely, weight average molecular chain length/number average molecular chain length, measured according to gel permeation chromatography of the ethylene-α-olefin-non-conjugated diene copolymer contained in the oil-extended copolymer is from 3 to 5, and preferably from 3 to 4. It is generally said that the Q value increases with increase of a molecular weight distribution, and as a result, kneadability and extrudability can be improved. Whereas, in the present invention, when the Q value exceeds 5, the molecular weight in a high molecular weight portion further increases to make insufficient dispersion of a reinforcing agent such as carbon black and inorganic fillers contained in the vulcanized solid rubber obtained. As a result, physical properties of the vulcanized solid rubber may deteriorate. When the Q value is less than 3, kneading workability in the production of the vulcanized solid rubber may deteriorate.

A process for producing the ethylene-α-olefin-non-conjugated diene copolymer contained in the oil-extended copolymer is not particularly limited. It can be produced by a conventional process using a conventional catalyst such as a titanium catalyst, a vanadium catalyst and a metallocene catalyst.

The "extender oil" used in the present invention means a petroleum softening agent conventionally used in the production of oil-extended rubber. Examples of the extender oil are paraffin, naphthene and aromatic extender oils obtained by purifying high boiling fractions of petroleum. These extender oils generally show a dynamic viscosity of from 5 to 35 $mm^2/s$ at 100° C.

The oil-extended copolymer used in the present invention is produced by a process wherein the extender oil is blended with the ethylene-α-olefin-non-conjugated copolymer during the production step thereof, not by a process wherein the ethylene-α-olefin-non-conjugated diene copolymer is once produced, and thereafter blended with the extender oil. More specifically, it is produced by a process wherein the extender oil is blended with the ethylene-α-olefin-non-conjugated diene copolymer dissolved in a solvent in the production step thereof. The reason therefor is that according to the latter process, it may result in failure to sufficiently blend the copolymer with the extender oil because of a high Mooney viscosity of the ethylene-α-olefin-non-conjugated diene copolymer used in the present invention.

With respect to a blending proportion of the ethylene-α-olefin-non-conjugated diene copolymer and the extender oil in the present invention, the extender oil is from 10 to 90 parts by weight, and preferably from 20 to 80 parts by weight, per 100 parts by weight of said copolymer. When the extender oil is less than 10 parts by weight, the vulcanized solid rubber obtained easily causes problems of poor kneadability, formation of carbon aggregation lumps, surface roughening and edge cutting of extrusion molded products, and surface roughening of die molded products. The present invention has solved these problems by combining the ethylene-α-olefin-non-conjugated diene copolymer having a high Mooney viscosity and the extender oil. When the extender oil exceeds 90 parts by weight, a viscosity of the blend comprising said copolymer and the extender oil is too low to obtain sufficient dispersion of a reinforcing agent such as carbon black and inorganic fillers in the vulcanized solid rubber obtained. As a result, the vulcanized solid rubber may deteriorate its characteristics.

A process for producing the vulcanized solid rubber in accordance with the present invention comprises, for example, the steps of (i) kneading a blend comprising the oil-extended copolymer, a vulcanizing agent and, if necessary, the below-mentioned ingredient, with a conventional kneading machine such as an open roll mill, a Banbury mixer, a kneader and an extruder to obtain a kneaded product, and (ii) vulcanizing (cross-linking) the resulting kneaded product under heating.

Examples of the vulcanizing agent are sulfur; sulfur chloride; sulfur dichloride; 4,4'-dithiodimorpholine; morpholine disulfide: alkylphenol disulfide; tetramethylthiuram disulfide; selenium dimethyldithiocarbamate; and organic peroxides such as dicumyl peroxide, 2,5-dimethyl-2,5-di(t-butylperoxy)hexane, 2,5-dimethyl-2,5-di(benzoylperoxy)hexane, 2,5-dimethyl-2,5-(t-butylperoxy)hexyne-3, di-t-butylperoxide, di-t-butylperoxide-3,3,5-trimethylcyclohexane and t-butylhydroperoxide. Of these, preferred are sulfur, dicumyl peroxide, di-t-butylperoxide and t-butylperoxide-3,3,5-trimethylcyclohexane.

Sulfur is used in an amount of usually from 0.1 to 10 parts by weight, and preferably from 0.5 to 5 parts by weight, per 100 parts by weight of the ethylene-α-olefin-non-conjugated diene copolymer. The organic peroxide is used in an amount of usually from 0.1 to 15 parts by weight, and preferably from 0.5 to 8 parts by weight, per 100 parts by weight of said copolymer.

The vulcanizing agent may be used, if necessary, in combination with a vulcanization accelerator and a vulcanization coagent. Examples of the vulcanization accelerator are N-cyclohexyl-2-benzothiazole-sufenamide, N-oxydiethylene-2-benzothiazole-sulfenamide, N,N-diisopropyl-2-benzothiazole-sulfenamide, 2-mercaptobenzothiazole, 2-(2,4-dinitrophenyl)mercaptobenzothiazole, 2-(2,6-diethyl-4-morpholinothio)benzothiazole, dibenzothiazyl-disulfide, diphenylguanidine, triphenylguanidine, di-o-tolylguanidine, o-tolyl-bi-guanide, diphenylguanidine-phthalate, an acetaldehyde-aniline reaction product, a butylaldehyde-aniline condensate, hexamethylenetetramine, acetaldehyde ammonia, 2-mercaptoimidazoline, thiocarbaniride, diethylthiourea, dibutylthiourea, trimethylthiourea, di-o-tolylthiourea, tetramethylthiuram monosulfide, teramethylthiuram disulfide, teraethylthiuram disulfide, terabutylthiuram disulfide, dipentamethylenethiuram tetrasulfide, zinc dimethyldithiocarbamate, zinc diethylthiocarbamate, zinc di-n-butylthiocarbamate, zinc ethylphenyldithiocarbamate, zinc butylphenyldithiocarbamate, sodium dimethyldithlocarbamate, selenium dimethyldithiocarbamate, tellurium diethyldithiocarbamate, zinc dibutylxanthate and ethylenethiourea. The vulcanization accelerator is used in an amount of from 0.1 to 20 parts by weight, and preferably from 0.2 to 10 parts by weight, per 100 parts by weight of the ethylene-α-olefin-non-conjugated diene copolymer.

Examples of the vulcanization coagent are metal oxides such as magnesium oxide and zinc oxide. Of these, preferred is zinc oxide. The vulcanization coagent is used usually in an amount of from 3 to 20 parts by weight per 100 parts by weight of the ethylene-α-olefin-non-conjugated diene copolymer.

When peroxides are used as the vulcanizing agent, examples of cross-linking coagent are sulfur, quinonedioxime compounds such as p-quinonedioxime, polyethylene glycol dimethacrylate, diallyl phthalate, triallyl cyanurate, triallyl isocyanurate, ethylene dimethacrylate and divinylbenzene.

In producing the vulcanized solid rubber using the oil-extended copolymer and the vulcanizing agent, if necessary, an ingredient such as plasticizers; fillers; resins such as, for example, polyethylene and polypropylene; and rubber such as ethylene-α-olefin-non-conjugated diene copolymers other than that mentioned above and different rubber may be incorporated.

The plasticizers may be those conventionally used for rubber. Examples thereof are process oil, lubricating oil, paraffin, liquid paraffin, petroleum asphalt, vaseline, coal tar pitch, caster oil, linseed oil, factice, beeswax, ricinolic acid, palmitic acid, barium stearate, calcium stearate, zinc laurate, atactic polypropylene and cumarone indene resin. Of these, particularly preferred is process oil. The plasticizer is used in an amount of usually from 10 to 150 parts by weight, preferably from 30 to 150 parts by weight, and more preferably from 50 to 150 parts by weight, per 100 parts by weight of the ethylene-α-olefin-non-conjugated diene copolymer. The amount can be determined from a viewpoint of flexibility of the vulcanized solid rubber obtained.

Examples of preferred fillers are carbon black such as SRF, GPF, FEF, HAF, ISAF, SAF, FT and MT, and inorganic fillers such as pulverized silicic acid, calcium carbonate, talc and clay, which are conventionally used for rubber.

The vulcanized solid rubber in accordance with the present invention can be used the most suitably for rubber vibration insulator such as an engine mount and a muffler hunger.

EXAMPLE

The present invention is illustrated in detail with reference to the following Examples, which are not intended to limit the scope of the present invention.

Comparative Examples 1 to 3 and Examples 1 to 6

Extender oil-extended copolymers or non-extended copolymers A to I used in these Comparative Examples and Examples are as shown in Table 1.

The oil-extended copolymers or non-extended copolymers, process oil, carbon black, calcium carbonate, stearic acid and zinc oxide, which are some of ingredients shown in Table 2, were kneaded in respective proportions (parts by weight) as shown in Table 2 with a Banbury mixer having a 1.5 l inner volume.

Successively, the resulting kneaded products were kneaded with "Mixture of other compounds 1", which is as shown in Table 2, using an 8-inch open roll, thereby obtaining respective non-vulcanized compositions. Here, the proportion of the above-mentioned process oil was controlled so as to make respective Mooney viscosities (Table 3) of the non-vulcanized compositions almost the same, so that processing conditions such as an extrusion condition applied for the non-vulcanized compositions were made equal.

The non-vulcanized composition obtained was extrusion-molded using a 45 mm extruder mounted with ribbon dies having 20 mm width and 2 mm thickness at a dies temperature of 80° C. and a cylinder temperature of 60° C. to obtain a ribbon-like article, and thereafter, appearance of the surface (evenness of the surface) of the ribbon-like article was visually judged. The results are as shown in Table 3.

The above-mentioned non-vulcanized composition was vulcanized in a mold at 160° C. for 25 minutes, thereby obtaining a sample for measuring its compressive permanent strain. Using a test piece prepared from the sample, its compressive permanent strain was measured according to JIS K 6262 under conditions of a compressive rate of the test piece=25%, a test temperature=70° C., and a test time=200 hours. The results are as shown in Table 3.

Gel permeation chromatography (GPC) measurement conditions for measuring Q values were as follows.

1. GPC Apparatus: GPC apparatus, a trade name of Type 150C-PLUS, manufactured by Waters Co.
2. Column: two columns, a trade name of TSK-GEL GMHHR-H(S), manufactured by Tosoh Corporation, were used.
3. Amount of sample: 300 μl (polymer concentration= 0.1% by weight)
4. Flow rate: 1 ml/min.
5. Temperature: 140° C.
6. Solvent: o-dichlorobenzene
7. Calibration curve: prepared by a conventional method using standard polystyrenes manufactured by Tosoh Corporation.

Table 3 summarizes as follows.

1. Each of Examples 1 to 6 demonstrates that appearance of the ribbon-like article obtained by extruding the non-vulcanized composition is good.
2. Each of Examples 1 to 6 demonstrates that compressive permanent strain of the vulcanized solid rubber is little.
3. Each of Comparative Examples 1 and 2 demonstrates that appearance is good, but compressive permanent strain of the vulcanized solid rubber is large.
4. Comparative Example 3 demonstrates that compressive permanent strain of the vulcanized solid rubber is little, but appearance is bad.

Comparative Example 4 and Example 7

Extender oil-extended copolymer B used in Comparative Example 4, and extender oil-extended copolymer J used in Example 7 are as shown in Table 1.

Respective non-vulcanized compositions were obtained by the same kneading method as mentioned above, except that ingredients as shown in Table 2 were used in respective proportions (parts by weight) as shown in Table 2.

The non-vulcanized composition was vulcanized in a mold at 160° C. for 25 minutes, thereby obtaining a sample for measuring its compressive permanent strain and a sample for measuring its fatigue durability.

The compressive permanent strain was measured according to JIS K 6262 under conditions of a compressive rate of the test piece of 25%, a test temperature of 120° C., and a test time of 70 hours. The results are as shown in Table 3.

The fatigue durability was measured by a method consisting of the steps of:

(i) stretching repeatedly a dumbbell No. 3 test piece in compliance with JIS K 6251 with a fixed load fatigue tester, a trade name of NRF-08S, manufactured by Yoshimidzu Co., under conditions of an atmospheric temperature of 80° C., a load of 0.1 to 1.9 kg and a frequency of 300 cpm, until the test piece has been broken, and (ii) measuring stretch-repeat numbers.

The results are as shown in Table 3. Table 3 summarizes as follows.

1. Example 7 demonstrates that compressive permanent strain of the vulcanized solid rubber is little, and fatigue durability thereof is good.
2. Comparative Example 4 demonstrates that compressive permanent strain of the vulcanized solid rubber is large, and fatigue durability thereof is insufficient.

TABLE 1

| | Extender oil-extended or non-extended ethylene-propylene-ethylidene norbornene copolymer used in Comparative Examples and Examples | | | | | | | | | |
|---|---|---|---|---|---|---|---|---|---|---|
| | A | B | C | D | E | F | G | H | I | J |
| Content of extender oil (part by weight)*1 | 0 | 20 | 0 | 20 | 30 | 40 | 20 | 40 | 40 | 30 |
| Ethylene unit/propylene unit (by weight) | 60/40 | 60/40 | 60/40 | 60/40 | 60/40 | 60/40 | 60/40 | 60/40 | 60/40 | 60/40 |
| Iodine value | 22 | 22 | 24 | 24 | 24 | 24 | 28 | 24 | 24 | 28 |
| Q value | 3.5 | 3.5 | 3.4 | 3.4 | 3.4 | 3.4 | 3.3 | 3.9 | 4.8 | 3.3 |
| Mooney viscosity ($ML_{1+4}$ 121° C.)*2 | | | | | | | | | | |
| Content of extender oil = 0 part by weight | 165 | 165 | — | — | — | — | — | — | — | — |
| Content of extender oil = 20 part by weight | 85 | 85 | 103 | 103 | 103 | 103 | 123 | 105 | 102 | 123 |
| Content of extender oil = 30 part by weight | — | — | 81 | 81 | 81 | 81 | — | — | — | 103 |
| Content of extender oil = 40 part by weight | — | — | 64 | 64 | 64 | 64 | — | 65 | 63 | — |

*1Content per 100 parts by weight of ethylene-propylene-ethylidene norbornene copolymer.

*2Content per 100 parts by weight of ethylene-propylene-ethylidene norbornene copolymer.

TABLE 2

| | Comparative Example | | | | Example | | | | | | |
|---|---|---|---|---|---|---|---|---|---|---|---|
| | 1 | 2 | 3 | 4 | 1 | 2 | 3 | 4 | 5 | 6 | 7 |
| Copolymer used (see Table 1) | A | B | C | B | D | E | F | G | H | I | J |
| Ratio of component for making non-vulcanized composition (part by weight) | | | | | | | | | | | |
| Above-mentioned copolymer | 100 | 120 | 100 | 120 | 120 | 130 | 140 | 120 | 140 | 140 | 130 |
| Process oil*1 | 95 | 75 | 105 | 40 | 85 | 75 | 65 | 90 | 65 | 65 | 30 |
| Carbon black*2 | 75 | 75 | 75 | 60 | 75 | 75 | 75 | 75 | 75 | 75 | 60 |
| Calcium carbonate | 20 | 20 | 20 | — | 20 | 20 | 20 | 20 | 20 | 20 | — |
| Stearic acid | 1 | 1 | 1 | 1 | 1 | 1 | 1 | 1 | 1 | 1 | 1 |
| Zinc oxide | 5 | 5 | 5 | 5 | 5 | 5 | 5 | 5 | 5 | 5 | 5 |
| Mixture of other compounds 1*3 | 8.9 | 8.9 | 8.9 | — | 8.9 | 8.9 | 8.9 | 8.9 | 8.9 | 8.9 | — |
| Mixture of other compounds 2*4 | — | — | — | 9 | — | — | — | — | — | — | 9 |

*1Process oil produced by Idemitsu Kosan Co., Ltd. (trademark: PW90).

*2Carbon black produced by Asahi Carbon Co., Ltd. (trademark: ASAHI 50HG).

*3The mixture consisting of 2 parts by weight of calcium oxide, 1.2 parts by weight of sulfur, 5.1 parts by weight of a vulcanization accelerator, which accelerator is a blend of 1.5 parts by weight of 2-mercapto-benzothiazole, 1.0 part by weight of zinc di-n-butyl dithiocarbamate, 0.7 part by weight of dipentamethylenethiuram tetrasulfide, 1.5 parts by weight of ethylene-thiourea and 0.4 part by weight of zinc dimethyl dithiocarbamate, and 0.6 part by weight of morpholine disulfide (trade-mark: VULNOC R) produced by Ouchishinko Chemical Industrial Co., Ltd.

*4The mixture consisting of 7 parts by weight of dicumyl peroxide (trademark: PERCUMYL D-40) produced by NOF Co., 1.5 parts by weight of ethylene glycol dimethacrylate and 0.5 parts by weight of sulfur.

TABLE 3

| | Comparative Example | | | | Example | | | | | | |
|---|---|---|---|---|---|---|---|---|---|---|---|
| | 1 | 2 | 3 | 4 | 1 | 2 | 3 | 4 | 5 | 6 | 7 |
| Mooney viscosity ($ML_{1+4}$ 100° C.) of non-vulcanized composition | 38 | 37 | 38 | 50 | 37 | 37 | 38 | 39 | 38 | 37 | 65 |
| Appearance of ribbon-like article obtained by extruding above non-vulcanized composition | good | good | bad | — | good | good | good | good | good | slightly good | — |
| Compressive permanent strain (%) of vulcanized solid rubber obtained by vulcanizing above non-vulcanized composition | 19.2 | 19.4 | 16.8 | 20.6 | 16.6 | 16.5 | 16.9 | 15.1 | 16.6 | 16.7 | 16.1 |
| Fatigue durability of vulcanized solid rubber obtained by vulcanizing above non-vulcanized composition | — | — | — | 15 × $10^4$ | — | — | — | — | — | — | 58 × $10^4$ |

What is claimed is:

1. Vulcanized solid rubber, which comprises a vulcanized product of an oil-extended copolymer comprising:
    (i) 100 parts by weight of an ethylene-α-olefin-non-conjugated diene copolymer satisfying the following requirements (1) to (4), and
    (ii) 10 to 90 parts by weight of an extender oil:
        (1) a weight ratio of an ethylene unit to an α-olefin unit in the ethylene-α-olefin-non-conjugated diene copolymer is from 73/27 to 40/60,
        (2) an iodine value of the ethylene-α-olefin-non-conjugated diene copolymer is from 20 to 36,
        (3) Mooney viscosity ($ML_{1+4}$ (121° C.)) measured according to JIS-K-6300 of a blend containing 100 parts by weight of the ethylene-α-olefin-non-conjugated diene copolymer and 20 parts by weight of an extender oil is from 100 to 180, and
        (4) a ratio of weight average molecular chain length/number average molecular chain length measured by gel permeation chromatography of the ethylene-α-olefin-non-conjugated diene copolymer is from 3 to 5.

2. The vulcanized solid rubber according to claim 1, wherein a weight ratio of an ethylene unit to an α-olefin unit in the ethylene-α-olefin-non-conjugated diene copolymer is from 67/33 to 45/55.

3. The vulcanized solid rubber according to claim 1, wherein an iodine value of the ethylene-α-olefin-non-conjugated diene copolymer is from 22 to 32.

4. The vulcanized solid rubber according to claim 1, wherein the α-olefin in the ethylene-α-olefin-non-conjugated diene copolymer contains propylene.

5. The vulcanized solid rubber according to claim 1, wherein the non-conjugated diene in the ethylene-α-olefin-non-conjugated diene copolymer contains 5-ethylidene-2-norbornene or dicyclopentadiene or a combination thereof.

6. Rubber vibration insulator comprising the vulcanized solid rubber according to claim 1.

7. An engine mount comprising the vulcanized solid rubber according to claim 1.

8. A muffler hanger comprising the vulcanized solid rubber according to claim 1.

9. A process for producing vulcanized solid rubber, which comprises the step of vulcanizing under heating a blend comprising:
    (i) an oil-extended copolymer, and
    (ii) a vulcanizing agent,
        the oil-extended copolymer containing:
        (a) 100 parts by weight of an ethylene-α-olefin-non-conjugated diene copolymer satisfying the following requirements (1) to (4), and
        (b) 10 to 90 parts by weight of an extender oil,
            (1) a weight ratio of an ethylene unit to an a-olefin unit in the ethylene-α-olefin-non-conjugated diene copolymer is from 73/27 to 40/60,
            (2) an iodine value of the ethylene-α-olefin-non-conjugated diene copolymer is from 20 to 36,
            (3) Mooney viscosity ($ML_{1+4}$ (121° C.)) measured according to JIS-K-6300 of a blend containing 100 parts by weight of the ethylene-α-olefin-non-conjugated diene copolymer and 20 parts by weight of an extender oil is from 100 to 180, and
            (4) a ratio of weight average molecular chain length/number average molecular chain length measured by gel permeation chromatography of the ethylene-α-olefin-non-conjugated diene copolymer is from 3 to 5.

* * * * *